United States Patent
Ulrey et al.

(10) Patent No.: US 7,640,916 B2
(45) Date of Patent: Jan. 5, 2010

(54) LIFT PUMP SYSTEM FOR A DIRECT INJECTION FUEL SYSTEM

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 12/021,498

(22) Filed: Jan. 29, 2008

(65) Prior Publication Data

US 2009/0188472 A1  Jul. 30, 2009

(51) Int. Cl.
*F02M 57/02* (2006.01)
*F02M 63/00* (2006.01)
*F02M 37/04* (2006.01)

(52) U.S. Cl. .................. 123/446; 123/447; 123/497
(58) Field of Classification Search .......... 123/446, 123/447, 497, 510, 511
See application file for complete search history.

(56) References Cited

U.S. PATENT DOCUMENTS

| | | | | |
|---|---|---|---|---|
| 4,260,333 A | * | 4/1981 | Schillinger | 417/45 |
| 5,372,116 A | * | 12/1994 | Davis | 123/516 |
| 5,411,002 A | * | 5/1995 | Smitley | 123/497 |
| 5,477,833 A | | 12/1995 | Leighton | |
| 5,572,974 A | * | 11/1996 | Wakeman | 123/497 |
| 5,701,869 A | * | 12/1997 | Richardson et al. | 123/497 |
| 5,715,797 A | | 2/1998 | Minagawa et al. | |
| 5,740,783 A | | 4/1998 | Learman et al. | |
| 5,765,535 A | | 6/1998 | Radermacher | |
| 5,941,214 A | * | 8/1999 | Hoffmann et al. | 123/456 |
| 6,029,629 A | * | 2/2000 | Tipton | 123/447 |
| 6,230,688 B1 | | 5/2001 | Faix et al. | |
| 6,253,739 B1 | * | 7/2001 | Golomb et al. | 123/509 |
| 6,293,757 B1 | * | 9/2001 | Oda et al. | 417/53 |
| 6,318,344 B1 | * | 11/2001 | Lucier et al. | 123/516 |
| 6,609,500 B2 | | 8/2003 | Ricco et al. | |
| 6,899,086 B2 | * | 5/2005 | Grant | 123/447 |
| 7,168,925 B2 | | 1/2007 | Humphries | |
| 2003/0024509 A1 | * | 2/2003 | Matusek et al. | 123/497 |
| 2003/0185668 A1 | | 10/2003 | Uffelman | |
| 2005/0005911 A1 | | 1/2005 | Djordjevic | |
| 2005/0005912 A1 | * | 1/2005 | Joos et al. | 123/458 |
| 2005/0199219 A1 | * | 9/2005 | Utsumi | 123/458 |
| 2008/0218105 A1 | * | 9/2008 | Wunderlich | 318/362 |

FOREIGN PATENT DOCUMENTS

JP  63-266149  11/1988

OTHER PUBLICATIONS

U.S. Appl. No. 11/867,552, filed Oct. 4, 2007, Pursifull.

* cited by examiner

*Primary Examiner*—Thomas N Moulis
(74) *Attorney, Agent, or Firm*—Allan J. Lippa; Alleman Hall McCoy Russell & Tuttle LLP (57) ABSTRACT

An economical method for controlling a lift pump operating as part of a direct injection fuel system is described. According to the method, the lift pump is operated at efficient operating conditions and then stopped until additional fuel is requested.

25 Claims, 4 Drawing Sheets

LIFT PUMP SYSTEM FOR A DIRECT INJECTION FUEL SYSTEM

FIELD

The present description relates to a method for controlling a lift pump operating as part of a direct injection fuel system.

BACKGROUND

One method and system for operating a fuel lift pump is described in U.S. Pat. No. 5,477,833. This patent describes a method for operating a lift pump in an intermittent manner. Specifically, the method describes shutting of the lift pump off as a way to avoid having a fuel return line. The fuel pump output is routed to an accumulator. The accumulator holds a volume of fuel and releases fuel to the fuel injectors as the injectors release fuel to engine cylinder ports. The lift pump is operated in this arrangement when pressure in the accumulator falls below a predetermined amount. Consequently, fuel pressure at the fuel injectors rises and falls as the fuel pump is operated and as fuel is injected to the engine. An engine controller adjusts fuel injection timing in an effort to compensate for the varying fuel pressure.

The above-mentioned system can also have several disadvantages. For example, while the system may improve fuel efficiency while producing fuel rail pressures used in port injection applications, it may provide little or no fuel efficiency benefit if the fuel pump is required to generate pressures necessary for direct injection applications because the fuel pump may have to be operated continuously to develop higher pressures. Further, the system can cause air-fuel errors when the engine controller makes adjustments to fuel injection timing related to pressure changes in the fuel rail.

The inventors herein have recognized the above-mentioned disadvantages and have developed a system and method that offers substantial improvements.

SUMMARY

One embodiment of the present description includes a system for delivering fuel directly to a cylinder of an internal combustion engine, the system comprising: a fuel lift pump supplying fuel to an injection pump; an accumulator located between the output of said lift pump and the input of said injection pump; and a controller that adjusts energy supplied to said lift pump such that a pressure at the inlet of said injection pump is above a first predetermined amount and wherein said controller stops energy supplied to said first fuel pump when said pressure at the inlet of said injection pump is greater than a second predetermined amount. This system overcomes at least some disadvantages of the above-mentioned method.

Lift pump energy consumption and thus engine fuel consumption can be reduced, at least during some conditions, by intermittently operating a lift pump that supplies fuel to a second fuel pump through an accumulator. In one example, the lift pump can be activated and deactivated in response to the fuel pressure developed at the inlet of an injection pump. This system allows an injection fuel pump to operate efficiently while at the same time efficiently operating the lift pump. When two fuel pumps can be operated efficiently, it is possible to reduce engine fuel consumption and achieve fuel pressures that are compatible with direct injection. Injection pump efficiency is achieved by keeping the fuel pressure at the inlet of the injection pump above the fuel vapor pressure, and lift pump efficiency is improved by operating the lift pump at an efficient operating condition for a brief period of time when engine fuel consumption is low.

When compared to other systems that utilize intermittently operated fuel pumps, the present system can also reduce air-fuel variation since the fuel rail pressure is maintained by an injection pump which is operated continuously. The more constant fuel pressure is maintained, the less air-fuel error may be introduced by having to compensate for pressure variation at the fuel injectors. It should be noted that the present system can adjust fuel pressure based on engine operating conditions if desired, but unlike the previously mentioned intermittently operated fuel pump system, fuel rail pressure is substantially constant for a selected engine operating condition.

The present description can provide several advantages. Namely, the approach can reduce fuel pressure variation at fuel injectors while simultaneously reducing lift pump energy consumption. This allows the system to reduce air-fuel errors as compared to some other fuel systems where the accumulator communicates directly to the fuel rail and thus the injectors. Further, the system provides injection pressures that permit fuel to be injected directly into cylinders. Further still, the system does not require a pressure transducer to monitor the lift pump output and therefore may reduce system cost.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
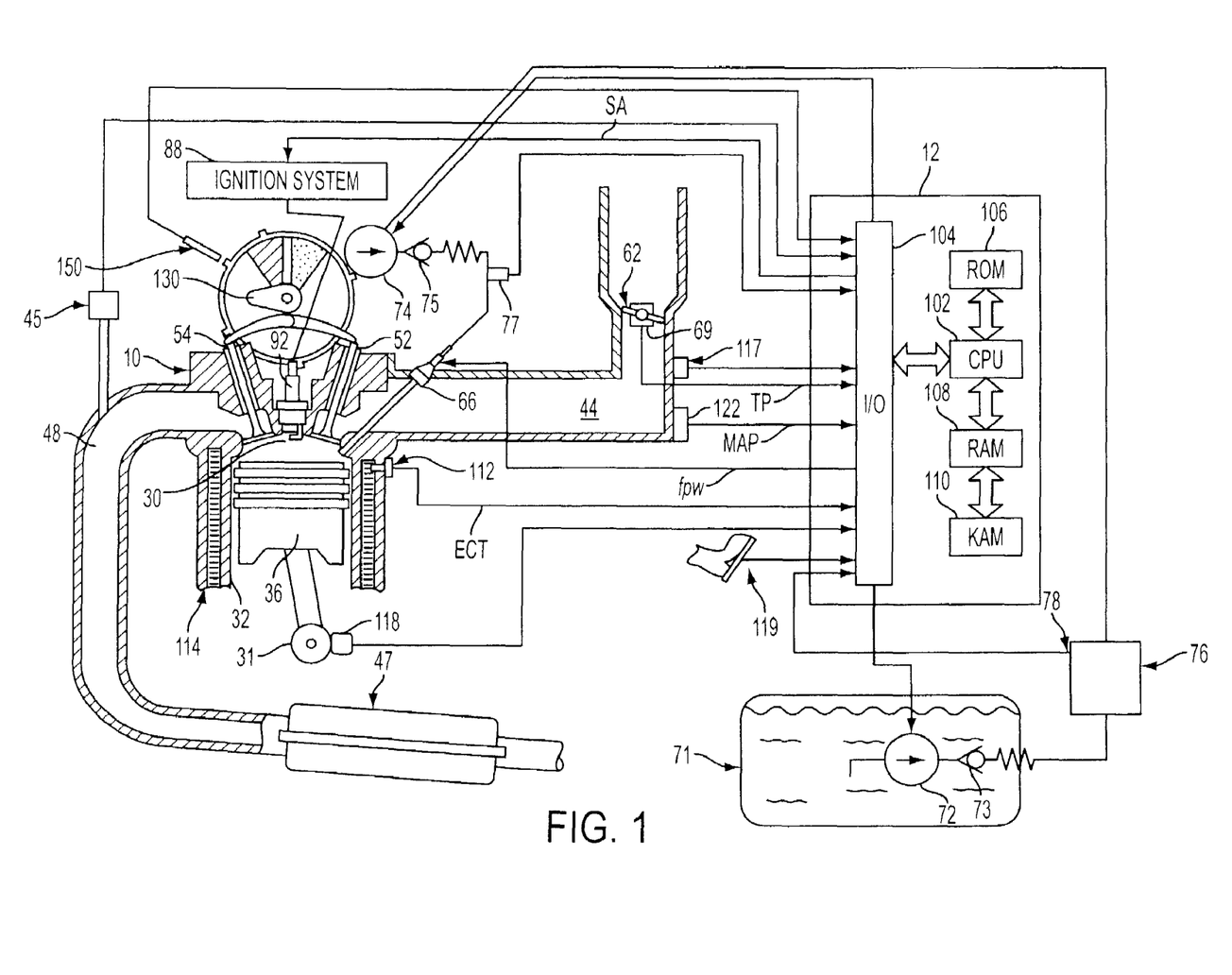
FIG. 1 is a schematic diagram of an engine, its fuel system, and its control system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 31. Combustion chamber 30 is known communicating with intake manifold 44 and exhaust manifold 48 via respective intake valve 52 an exhaust valve 54. Each intake and exhaust valve is operated by a mechanically drive cam 130. Alternatively, intake valves and/or exhaust valves may be operated by electrically actuated valves.

Intake manifold 44 is shown communicating with optional electronic throttle 62. Fuel is injected directly into cylinder 30 by way of fuel injector 66. The amount of fuel delivered is proportional to the pulse width of signal FPW sent from controller 12. Fuel is delivered to fuel injector 66 by injection pump 74. The injection pump may be mechanically driven by the engine or electrically driven. Check valve 75 allows fuel flow from injection pump 74 to fuel injector 66 and limits flow from fuel injector 66 to injection pump 74. Lift pump 72 provides fuel from fuel tank 71 to fuel injection pump 74. Lift pump 72 may be electrically or mechanically driven. Check valve 73 allows fuel to flow from fuel pump 72 and limits fuel flow backwards into fuel pump 72. Pressure accumulator 76 hold a volume of fuel that reduces the rate of fuel pressure increase or decrease between fuel pump 72 and fuel injection pump 74. The volume of accumulator 76 may be sized such that engine 10 can operate at idle conditions for a predetermined period of time between operating intervals of fuel pump 72. For example, accumulator 76 can be sized such that when engine 10 idles, it takes 1 or more minutes to deplete pressure in accumulator 76 to a level at which fuel pump 74 is incapable of maintaining a desired pressure to fuel injector 66.

Note that the lift pump and/or injection pumps described above may be electrically, hydraulically, or mechanically driven without departing from the scope or breadth of the present description.

Distributor-less ignition system 88 provides ignition spark to combustion chamber 30 via spark plug 92 in response to controller 12. Universal Exhaust Gas Oxygen (UEGO) sensor 45 is shown coupled to exhaust manifold 48 upstream of catalytic converter 47. Converter 47 can include multiple catalyst bricks, in one example. In another example, multiple emission control devices, each with multiple bricks, can be used. Converter 47 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a fuel rail pressure sensor 77; cam position sensor 150; optional accumulator fuel pressure sensor 78; a throttle position sensor 69; a measurement (ACT) of engine air amount temperature or manifold temperature from temperature sensor 117; a engine position sensor from a Hall effect sensor 118 sensing crankshaft 31 position; and power driver circuitry capable of providing actuating energy to actuate valves as well as capability to provide current for heating valve actuators. In one aspect of the present description, engine position sensor 118 produces a predetermined number of equally spaced pulses every revolution of the crankshaft from which engine speed (RPM) can be determined.

Storage medium read-only memory 106 can be programmed with computer readable data representing instructions executable by processor 102 for performing the methods described below as well as other variants that are anticipated but not specifically listed.

Figure 2:
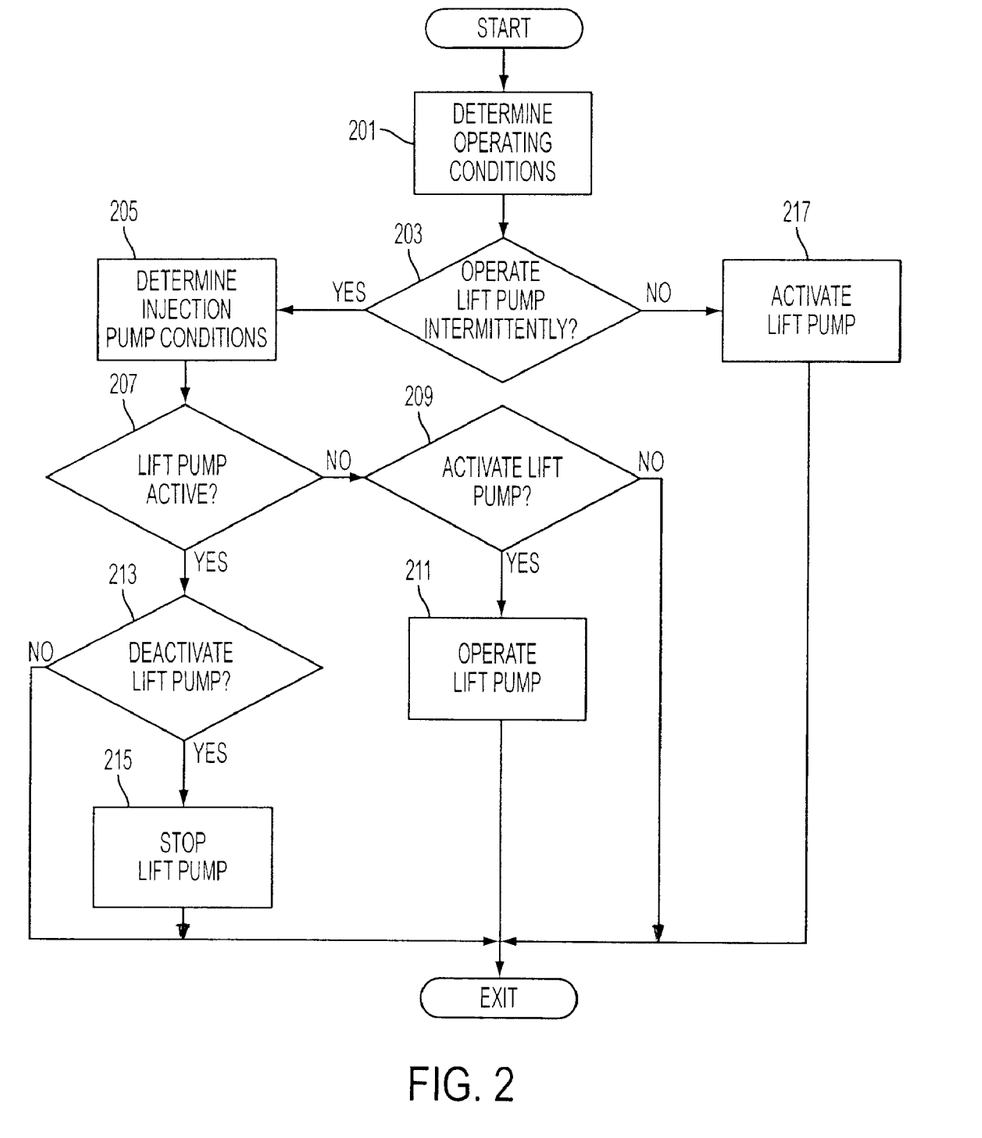
FIG. 2 is a flowchart of an example lift pump control strategy.

Referring now to FIG. 2, a flow chart of an example lift pump control method is shown. The method of FIG. 2 operates a lift pump in different modes and sets the lift pump "on" duration in relation to injection pump operating efficiency, or alternatively, the lift pump "on" duration can be related to injection pump inlet pressure. The injection pump is located downstream of the lift pump and its operating efficiency is partially determined by the pressure at which fuel is supplied to it.

A lift pump can be sized to have a large dynamic range that corresponds to the engine's fuel consumption dynamic range. For example, at one engine speed and load an engine may consume 50 cc/sec while at another operating condition it consumes 0.5 cc/sec. Given this dynamic range, the lift pump may meet the engine's fuel requirements at certain engine operating conditions by operating the lift pump at high efficiency conditions using a 1% duty cycle instead of continuously operating the lift pump at low efficiency. The inventors herein have recognized that an injection pump can be supplied fuel at varying pressures without compromising the ability to control fuel pressure in the fuel rail. In one example, the lift pump is operated intermittently while a valve at the inlet side of the injection pump is adjusted to maintain a desired pressure in the fuel rail.

Continuing with FIG. 2, at step 201, operating conditions are determined. In one embodiment, controller 12 determines engine fuel flow rate, ambient air temperature, engine speed, and fuel rail pressure. Engine fuel flow rate can be determined from sensing fuel rail pressure and injection timing. Then, rail pressure and injection timing can be used to look up fuel flow using injector characterizations. In an alternative embodiment, fuel flow can be determined from the engine air flow and the desired air-fuel ratio.

The routine can also keep track of the amount of fuel consumed in between lift pump activation cycles. In one embodiment, the lift pump can be reactivated based on the amount of fuel consumed after the accumulator has been recharged to a specified capacity, see step 209. The amount of fuel consumed can be found by summing the individual amounts of fuel that are injected to engine cylinders after the lift pump is deactivated. The routine proceeds to step 203 after operating conditions are determined.

In step 203, the routine determines which mode to operate the lift pump. The lift pump may be operated intermittently (i.e., turned on and off, when during the off period pump speed goes to zero) or it may be operated continuously during some operating conditions. In one example, engine speed and load are used to index a table that outputs a particular desired mode. The desired modes can be empirically determined by performing tests at different engine operating conditions. In this example, the lift pump is operated intermittently at lower engine speeds and loads. During these conditions, fuel flowing to the engine is low and the lift pump has capacity to supply fuel at a rate that is higher than the engine's fuel consumption rate. Therefore, the lift pump can fill the accumulator and then be turned off while the engine continues to operate (i.e., combusting air-fuel mixtures) for one or more minutes before the lift pump is has to be restarted. Restarting the lift pump replenishes fuel to the accumulator that was injected to the engine while the lift pump was off.

During higher engine speeds and loads the lift pump is operated continuously. In one embodiment, the lift pump is operated continuously when the lift pump cannot exceed the engine fuel flow rate by 25% when the pump is operated at a 75% "on" duty cycle and a period is 1.5 minutes. However, if desired, the "on" duty cycle level that triggers continuous lift pump operation can be adjusted to be 35%, 40%, 45%, 50%, 55%, 60%, 65%, or 70%, if desired. In another embodiment, the lift pump is operated continuously when the amount of fuel injected to the engine exceeds a predetermined level. Further, the operating period may be selected to lie between 10 seconds and 5 minutes. If the lift pump flow rate exceeds the engine fuel consumption rate by a predetermined amount, 25% for example, the routine proceeds to step 205. Otherwise, the routine proceeds to step 217.

Referring now to step 205, the routine determines the injection pump volumetric efficiency. In one example, injection pump efficiency is determined from the equation:

$$\text{Pump\_eff} = \frac{\frac{\text{Rail\_pres\_inc}}{\text{Eff\_mod}} + \text{Ful\_vol\_inj}}{\text{Num\_strokes} \cdot \text{Pump\_cmd} \cdot \text{Max\_stk\_vol}}$$

where Pump_eff is the injection pump efficiency, Rail_pres_inc is the injector rail pressure increase, Eff_mod is the fuel's effective bulk modulus, Rail_vol is the fuel rail volume, Ful_vol_inj is the volume of fuel injected to the engine, Num_strokes is the number of pump strokes, Pump_cmd is a portion of the pump stroke volume that a controller can command of the total pump stroke, Num_strokes is the number of pump strokes during a particular operating interval, and Max_stk_vol is the total pump stroke volume when the pump piston is at bottom-dead-center of its trajectory. After determining the pump volumetric efficiency, the routine proceeds to step 207.

In an alternate embodiment, injection pump inlet pressure can be compared to fuel vapor pressure to determine whether or not to start the lift pump. The injection pump inlet pressure can be directly measured by a pressure transducer; or in the alternative, inferred from the volume of fuel stored in the accumulator. The fuel vapor pressure can be inferred from fuel temperature. If the fuel pressure approaches the fuel vapor pressure (e.g., within 47 kPa) the lift pump is activated so that the fuel remains in a liquid state.

At step 207, the routine determines whether or not the lift pump is presently active. If so, the routine proceeds to step 213. If not, the routine proceeds to step 209.

At step 209, the routine determines whether or not to activate the lift pump. If the injection pump volumetric efficiency is below a predetermined amount, 60% for example, the routine proceeds to step 211 to reactivate the lift pump. If the injector pump volumetric efficiency is above the predetermined amount, the injection pump inlet pressure is determined to be adequate and the routine proceeds to exit.

In an alternative embodiment, the amount of fuel consumed by the engine (see step 201) can be used to predict when the injection pump will reach a predetermined efficiency level. Specifically, the amount of fuel consumed after lift pump deactivation determined in step 201, can be related to a predetermined lift pump efficiency determined in step 205, so that the lift pump may be reactivated in response to the amount of fuel consumed since the lift pump was deactivated. In one example, lift pump reactivation can be accomplished by comparing the amount of fuel consumed during the present lift pump deactivation cycle to the amount of fuel consumption learned during a previous lift pump deactivation cycle when the injection pump efficiency degraded to a predetermined level. Fuel consumption is learned by storing the amount of fuel consumed since the lift pump was deactivated until a certain level of injection pump efficiency is reached. In this way, the routine can relate the amount of fuel consumed to injection pump efficiency. This method allows the routine to anticipate when to reactivate the lift pump so that the injection pump efficiency does not fall below a predetermined level. In one embodiment, extrapolation can be used to predict when fuel consumption will reach a level that corresponds to an injection pump efficiency at which it is desirable to have the lift pump reactivated. Since a lift pump requires some time to develop pressure after power is applied to the pump, extrapolation can be used to project fuel consumption and reactivate the lift pump in response to extrapolated fuel consumption. This method ensures that the lift pump begins to increase supply pressure when the injector pump inlet is near a pressure that will produce the desired injection pump efficiency. If desired, the amount of fuel consumed can also be used to reactivate the lift pump before a certain level of injection pump efficiency is reached. For example, the lift pump can be reactivated when fuel consumption is at an amount that corresponds to 70% injection pump efficiency rather than a lower limit of 60% efficiency.

At step 211, the routine activates and operates the lift pump. In one example, efficient pump operating conditions are selected and voltage is applied such that these conditions are substantially achieved (i.e., voltage applied to the lift pump may vary by ±3 volts or less from a predetermined efficient operating condition) at the lift pump. In one example, the efficient operating conditions are selected from an empirically determined map of lift pump performance; see FIG. 4 for example.

At step 213 the routine determines whether or not to deactivate the lift pump. Once the lift pump is activated, controller 12 determines how much fuel has been injected to the engine and how much fuel the lift pump has pumped to the accumulator and injection pump. The amount of fuel injected to the engine is subtracted from the amount of fuel pumped to the accumulator and injection pump. The remainder is the amount of fuel residing in the accumulator. The amount of fuel pumped to the accumulator and the injection pump may be determined by empirical data or a model of lift pump performance. In one example, the current or voltage applied to the lift pump and the amount of pumping time are used to determine the amount of pumped fuel.

When the amount of fuel pumped to the accumulator (i.e., the volume of fuel) exceeds the accumulator volume by a predetermined amount (e.g., 20%), the lift pump is deactivated. Alternatively, the lift pump may be deactivated when accumulator or inlet pressure of the second pump exceeds a predetermined amount. The routine proceeds to step 215 to deactivate the lift pump. Otherwise, the routine proceeds to exit and the pump continues to operate Note that the actual volume of fuel pumped by the lift pump to the accumulator cannot exceed the system volume that is downstream of the lift pump. When the pump fills the entire accumulator volume, the pump is dead headed and spins without pumping additional fuel.

At step 215, the lift pump is deactivated and ceases to operate until it is reactivated. Controller 12 outputs a command that reduces the voltage and current applied to the lift pump. The lift pump is off for a sufficient period of time so that lift pump speed goes to zero. The routine exits after the pump is stopped.

At step 217, the routine activates the lift pump in continuous operating mode. The lift pump may be operated at a substantially constant voltage (e.g., 12 volts±2 volts), or voltage may be modulated such that the pump speed can be controlled to deliver a desired pressure at the injection pump inlet. In another embodiment, current may be controlled to continuously operate the lift pump.

If the voltage supplied to the lift pump is modulated, the lift pump turns continuously without stopping between voltage pulses. Providing a narrowly spaced pulse train of voltage allows controller 12 to control pump flow so that lift pump flow essentially matches the amount of fuel being injected to the engine. This operation can be accomplished by setting the lift pump duty cycle as a function of engine speed and load, for example. Alternatively, the average voltage supplied to the lift pump from the modulated voltage can be varied as the amount of fuel supplied to the engine varies. As a result, a lift pump pressure regulator is not necessary when the lift pump is operated in continuous mode. Alternatively, a controlled current output may be used to supply current to the lift pump. In this embodiment, the amount of current supplied to the lift pump can be varied with engine speed and load such that a pressure regulator is not required downstream of the lift pump.

If a constant current or voltage is applied to the lift pump this mode may be restricted to certain engine operating conditions, higher engine speeds and loads for example.

After the lift pump is activated the routine proceeds to exit.

Figure 3:
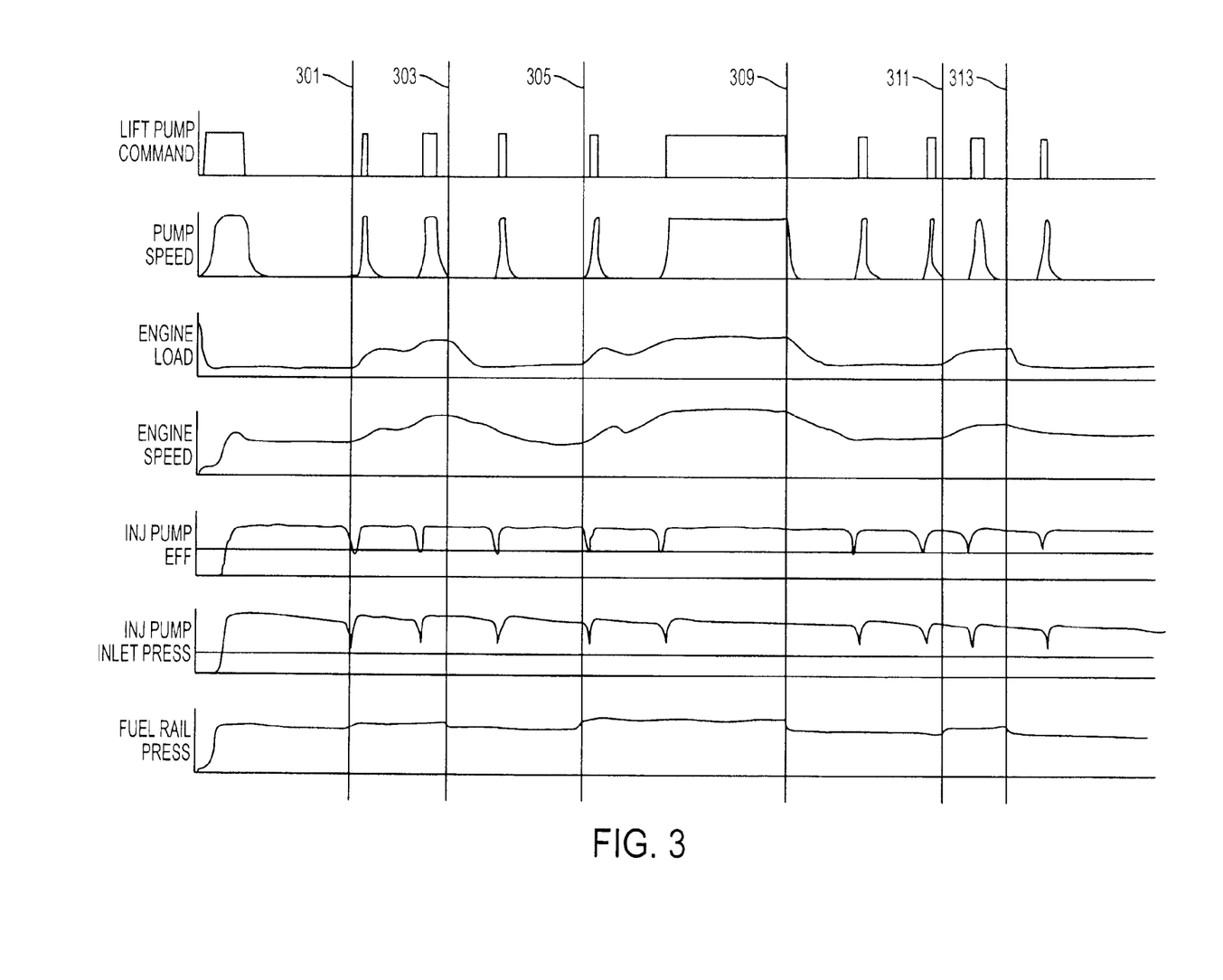
FIG. 3 is an example timing diagram for selected fuel system signals.

Referring now to FIG. 3, a plot of representative signals of interest when operating a lift pump using the method described by FIG. 2.

The signals begin on the left and moves to the right. The X-axis represents time while the Y-axis of each individual graph corresponds to the labeled parameter. Vertical marker lines 301, 303, 305, 309, 311, and 313 identify various points of interest during the illustrated sequence.

The sequence begins at the far left-hand side of the figure. At this point, the engine is off and is then cold started (i.e., the engine has not been operated for a period of time and the engine temperature is substantially ambient air temperature) shortly thereafter. During the starting process, the lift pump is commanded on. The lift pump is commanded on to ensure injection pump efficiency and to recharge the accumulator. The engine begins to combust air-fuel mixtures causing the engine to accelerate. As engine speed increases and then stabilizes at idle speed, injector pump efficiency increases and the fuel rail pressure stabilizes at a level sufficient to support direct injection to the engine cylinders. Notice that the lift pump stays on even as the injector pump efficiency reaches a high level. This allows the lift pump to pressurize and fill the accumulator located downstream from the lift pump.

The lift pump is operated until it has filled the accumulator. Alternatively, the lift pump may be operated until a specified or predetermined level or volume of fuel is present in the accumulator. Then it is shut off, and the lift pump speed is reduced to zero. Fuel continues to be injected to the engine cylinders while the injection pump is off. In addition, the fuel rail fuel pressure is maintained at a substantially constant pressure during the idle period by adjusting a valve at the injection pump. The fuel rail pressure is maintained by pumping fuel from accumulator 76 to the fuel rail using injection pump 74. The accumulator provides the injection pump fuel at a pressure that is near or higher than the fuel vapor pressure. As mentioned in the description of FIG. 2, pressure at the injection pump inlet is one parameter by which the lift pump can be activated. In another embodiment, the lift pump efficiency is used to determine when to activate the lift pump. If the lift pump efficiency degrades, it indicates fuel vapor is forming at the pump inlet and lift pump pressure has to be increased to increase the injector pump efficiency.

As noted above, during low engine loads and speeds, the accumulator can provide enough fuel to idle the engine for several minutes. The amount of idle time between lift pump running events is related to the accumulator volume. However, it should be noted that increasing the accumulator volume may also increase the amount of time that it takes to charge the accumulator during a cold start. Accordingly, it is desirable to start the lift pump in anticipation of starting the engine.

At vertical marker 301, engine speed and load begin to increase. Just before this event, injection pump efficiency and lift pump inlet pressure begin to be reduced. As described in the method of FIG. 2, lift pump inlet pressure or injection pump efficiency can be used to determine when to restart the lift pump. In one example, when lift pump inlet pressure reaches a predetermined level, the lift pump is restarted. In another example, when injection pump efficiency reaches a predetermined level, the lift pump is restarted. The lift pump is deactivated after it is determined that the accumulator has been filled, or at least filled to a predetermined level or volume. The deactivated lift pump coasts to a stop where it waits to be restarted.

The fuel rail pressure is substantially constant during the engine idle period and is increased slightly as the engine speed and load are increased. Since engine cylinder pressure increases with engine load, increasing the fuel rail pressure allows fuel to be injected into engine cylinders as cylinder pressure increases. Further, increasing fuel rail pressure with engine speed also allows a cylinder to be fueled within a certain crankshaft angle. As engine speed increases, the amount of time it takes the engine to rotate through a given crankshaft angle decreases. By increasing fuel pressure, equivalent fuel amounts may be injected within a particular crankshaft window even though engine speed has increased from one engine operating condition to another.

Between vertical markers 301 and 303, engine speed and load are gradually increased and the lift pump is restarted to replenish fuel that is pulled from the accumulator and injected to the engine. Also notice that the interval between lift pump restarts is reduced and that the time that the lift pump is on is increased. Operating the engine at higher speeds and loads increases engine fuel consumption and empties the accumulator at a faster rate. And since fuel is being injected to the engine while the accumulator is filled, it takes longer for the lift pump to fill the accumulator.

Engine speed and load are reduced to the left of vertical marker 303, this load reduction increases the time between lift pump "on" intervals and reduces the amount of time necessary for the lift pump to fill the accumulator. Fuel rail pressure is also reduced because less injection pressure is necessary at lower engine loads.

At vertical marker 305, engine speed and load are once again increased. Shortly thereafter, the lift pump is restarted to replenish fuel extracted from the accumulator. The fuel pump is restarted again before vertical marker 309 in a continuous operation mode. In one example, this mode is triggered by operating the engine above predetermined engine speed and load levels. In this mode, the lift pump continues to rotate without being deactivated and returning to zero speed. The fuel rail pressure is also increased so that fuel can be directly injected to engine cylinders while the cylinders are operated at higher speeds and loads.

It should be noted that the fuel pump command voltage may be modulated at a frequency and duty cycle that increases or decreases lift pump efficiency without deactivating the lift pump and sending the pump to zero speed during continuous operating mode. In this way, the lift pump output may be regulated such that the lift pump flow rate substantially matches the amount of fuel being injected to the engine (e.g., engine fuel flow and lift pump fuel flow rates may be within ±10% of each other).

At vertical marker 309, engine load is decreased and the lift pump is deactivated. The engine also returns to an idle condition where the lift pump is operated intermittently in response to injection pump efficiency or lift pump inlet pressure.

Between vertical markers 311 and 313, engine speed and load are increased. Similar to the interval between markers 301 and 303, the time between lift pump "on" events is decreased and the lift pump "on" time is increased. Again, this permits the lift pump to meet the engine's increased fuel requirements.

After marker 313, the engine speed and load are decreased and the engine returns to an idle condition. At idle, the lift pump "off" interval is increased and the lift pump "on" time is decreased to reflect the engine's lower fuel consumption during these conditions.

Figure 4:
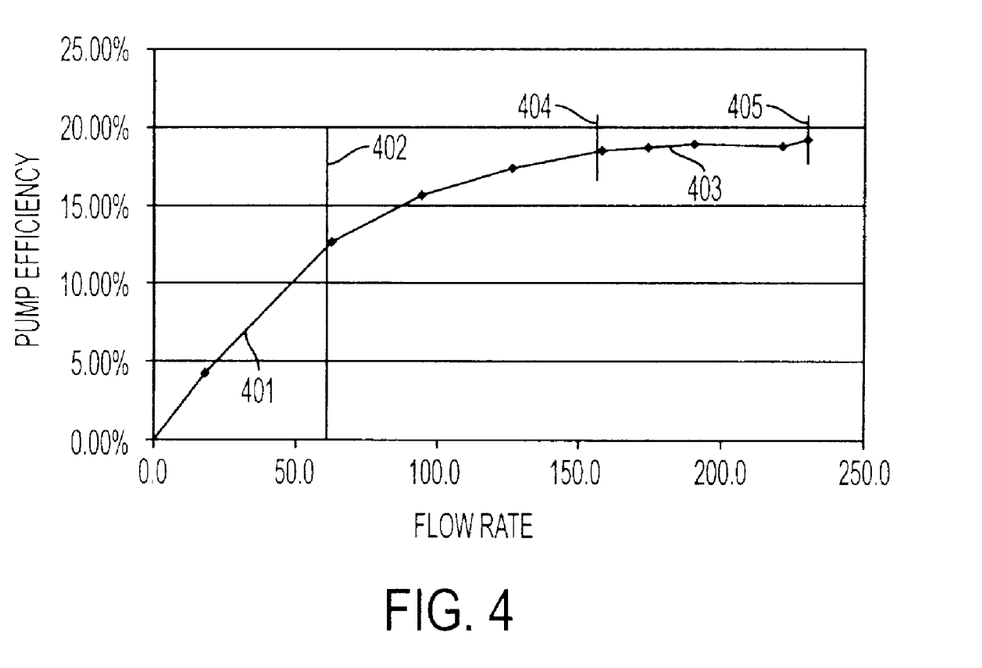
FIG. 4 is a plot that illustrates lift pump efficiency versus pump flow.

Referring now to FIG. 4, a plot that shows lift pump efficiency as a function of fuel flow rate is shown. The X-axis represents fuel flow rate and the Y-axis represents pump efficiency at a substantially constant output pressure. It can be seen that pump efficiency is low at low flow rates. The pump efficiency gradually increases and then saturates or substantially stops increasing at flow rates above 150. When the lift pump is operated by the method of FIG. 2 in intermittent mode, it is operated in the area of curve 403 and bounded by markers 404 and 405. This region is the higher pumping efficiency region. Operating the pump in this region can reduce engine fuel consumption since the engine has to produce less electricity to operate the lift pump and because the lift pump fills the accumulator quicker when operated at these conditions. In this region, the lift pump is operated within 90% of rated efficiency. However, it should be noted that the pump may be operated at lower efficiencies, 85% or 80% of rated efficiency for example, during this mode of operation by reducing the voltage or current applied to the lift pump, if desired.

During continuous mode operation, the lift pump may be operated in the region encompassing curve 401, if desired. As described above, the pump can be operated at lower efficiencies by modulating the pump supply voltage or by reducing the amount of current supplied to the lift pump. From zero flow to marker 402, FIG. 4 illustrates one example region where the lift pump is operated at lower efficiencies by modulating pump voltage. However, it should also be noted that pump efficiency can be improved above marker 402 by modulating the voltage supplied to the lift pump, if desired.

The methods, routines, and configurations disclosed herein are exemplary and should not be considered limiting because numerous variations are possible. For example, the above disclosure may be applied to I3, I4, I5, V6, V8, V10, and V12 engines operating in natural gas, gasoline, diesel, or alternative fuel configurations.

The following claims point out certain combinations regarded as novel and nonobvious. Certain claims may refer to "an" element or "a first" element or equivalent. However, such claims should be understood to include incorporation of one or more elements, neither requiring nor excluding two or more such elements. Other variations or combinations of claims may be claimed through amendment of the present claims or through presentation of new claims in a related application. The subject matter of these claims should be regarded as being included within the subject matter of the present disclosure.

The invention claimed is:

1. A system for delivering fuel directly to a cylinder of an internal combustion engine, the system comprising:
   a fuel lift pump supplying fuel to an injection pump;
   a fuel line coupling an output of said fuel lift pump to an inlet of said injection pump;
   an accumulator coupled to the fuel line and between the output of said lift pump and the inlet of said injection pump; and
   a controller that adjusts energy supplied to said lift pump such that a pressure at an outlet of the accumulator is above a first predetermined amount and wherein said controller stops energy supplied to said fuel lift pump when said pressure at the outlet of the accumulator is greater than a second predetermined amount.

2. The system of claim 1 wherein said first predetermined amount is related to a fuel vapor pressure.

3. The system of claim 2 wherein said fuel vapor pressure is measured or inferred.

4. The system of claim 1 wherein the speed of said lift pump goes to zero after said controller stops current flow to said fuel lift pump.

5. The system of claim 1 wherein said energy is a controlled voltage or current.

6. The system of claim 1 wherein said lift pump is electrically driven and said injection pump is mechanically driven.

7. The system of claim 1 wherein said pressure is determined from a pressure transducer.

8. The system of claim 5 wherein said voltage or current is supplied at a level that operates said fuel pump within 15% of the fuel pump rated operating efficiency for a given pump inlet fuel pressure.

9. The method of claim 6 wherein said injection pump is driven by said internal combustion engine.

10. A system for delivering fuel directly to a cylinder of an internal combustion engine, the system comprising:
    a first electrically driven fuel pump supplying fuel to a second mechanically driven fuel pump;
    a fuel line fluidly coupling an output of said first electrically driven fuel pump to an inlet of said second mechanically driven fuel pump;
    an accumulator coupled to the fuel line and between the output of said first fuel pump and the inlet of said second mechanically driven fuel pump; and
    a controller that supplies current to said first fuel pump to when the efficiency of said second mechanically driven fuel pump is less than a predetermined amount and wherein said controller stops current flow to said first fuel pump when the efficiency of said second mechanically driven fuel pump is greater than a predetermined amount.

11. The system of claim 10 wherein said controller further conditions stopping current flow to said first fuel pump in response to an inferred or measured pressure at the inlet of said second mechanically driven fuel pump.

12. The system of claim 10 wherein the amount of fuel consumed while said first electrically driven fuel pump is deactivated is used to determine the efficiency of said second mechanically driven fuel pump.

13. The system of claim 11 wherein said inferred or measured pressure is greater than the vapor pressure of the fuel supplied to the inlet of said second fuel pump.

14. The system of claim 10 wherein said efficiency of said second mechanically driven fuel pump is determined from the volumetric flow rate of said second mechanically driven fuel pump.

15. The system of claim 10 wherein said controller further conditions stopping current flow to said first fuel pump when fuel fills more than a predetermined volume of an accumulator located downstream of said first fuel pump.

16. A method to deliver fuel to a cylinder of an internal combustion engine, the method comprising:
    combusting fuel in at least a cylinder of said internal combustion engine;
    operating an electrically driven fuel pump in a first mode to deliver said fuel from a fuel source to an accumulator and a mechanically driven fuel pump, the accumulator coupled to a fuel line, the fuel line coupling an inlet of said mechanically driven fuel pump to an outlet of said electrically driven fuel pump, while said engine is combusting said fuel, said electrically driven fuel pump being activated in said first mode when fuel pressure at an outlet of the accumulator is below a predetermined level, said electrically driven fuel pump being deactivated in said first mode when fuel pressure at the outlet of the accumulator is above a predetermined level;

operating a mechanically driven fuel pump to deliver fuel from said mechanically driven fuel pump to at least a fuel injector; and injecting fuel from said at least a fuel injector directly into said cylinder of said internal combustion engine.

17. The method of claim 16 wherein fuel pump speed of said electrically driven fuel pump goes to zero after said electrically driven fuel pump is deactivated.

18. The method of claim 16 further comprising a second mode of operating said electrically driven fuel pump wherein said electrically driven fuel pump is operated continuously while the amount of fuel injected to said internal combustion exceeds a predetermined level.

19. The method of claim 16 wherein the average voltage applied to said electrically driven fuel pump is varied as the amount of fuel injected to said internal combustion varies.

20. The method of claim 16 wherein said accumulator is sized to enable said engine to idle for a period exceeding one minute without activating said electrically driven fuel pump.

21. A method to deliver fuel to a cylinder of an internal combustion engine, the method comprising:

combusting fuel in at least a cylinder of said internal combustion engine;

operating a first fuel pump in a first mode when the amount of fuel being delivered to said internal combustion engine is less than a first amount, said first mode comprising delivering said fuel from an accumulator to a second fuel pump during said combustion, said accumulator coupled to a fuel line, the fuel line coupling an outlet of said first fuel pump to an inlet of said second fuel pump and said first fuel pump being activated in said first mode when a fuel pressure at an outlet of the accumulator is below a predetermined level, said first fuel pump being deactivated in said first mode when the fuel pressure at the outlet of the accumulator is above a predetermined level; and operating said first fuel pump in a second mode when the amount of fuel being delivered to said internal combustion engine is greater than said first amount, said second mode comprising delivering said fuel from said fuel source to said second fuel pump while there is combustion occurring during a cycle of said at least a cylinder, said first fuel pump being supplied a varying voltage without the speed of said fuel pump going to zero.

22. The method of claim 21 wherein when voltage is applied to said first fuel pump during said first mode, said voltage is substantially constant.

23. The method of claim 21 wherein fuel pump speed goes to zero after said fuel pump is deactivated in said first mode.

24. The method of claim 21 wherein said varying voltage is a pulsewidth modulated voltage.

25. The method of claim 21 wherein deactivation of said first fuel pump is further determined by a volume of fuel in an accumulator located downstream of said first fuel pump.

* * * * *